United States Patent
Kusumi et al.

(10) Patent No.: US 10,321,113 B2
(45) Date of Patent: Jun. 11, 2019

(54) PROCESSING APPARATUS, PROCESSING SYSTEM, IMAGE PICKUP APPARATUS, PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Yuichi Kusumi, Utsunomiya (JP); Chiaki Inoue, Utsunomiya (JP); Yoshiaki Ida, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 248 days.

(21) Appl. No.: 15/361,684

(22) Filed: Nov. 28, 2016

(65) Prior Publication Data
US 2017/0155883 A1    Jun. 1, 2017

(30) Foreign Application Priority Data
Nov. 30, 2015    (JP) .................................. 2015-232849

(51) Int. Cl.
| | |
|---|---|
| H04N 7/12 | (2006.01) |
| H04N 11/02 | (2006.01) |
| H04N 13/133 | (2018.01) |
| H04N 13/15 | (2018.01) |
| H04N 13/204 | (2018.01) |

(Continued)

(52) U.S. Cl.
CPC .......... *H04N 13/133* (2018.05); *G06T 7/586* (2017.01); *H04N 13/15* (2018.05); *H04N 13/204* (2018.05); *H04N 13/254* (2018.05); *H04N 13/257* (2018.05); *H04N 13/271* (2018.05); *G06T 2207/10024* (2013.01); *G06T 2207/10152* (2013.01); *H04N 2013/0077* (2013.01)

(58) Field of Classification Search
None
See application file for complete search history.

(56) References Cited

U.S. PATENT DOCUMENTS

| | | | |
|---|---|---|---|
| 9,137,511 B1 | 9/2015 | LeGrand, III et al. | |
| 2007/0159668 A1* | 7/2007 | Kui-Lv | H04N 1/40012 358/484 |

(Continued)

FOREIGN PATENT DOCUMENTS

| | | |
|---|---|---|
| JP | 2010122158 A | 6/2010 |
| JP | 2015059849 A | 3/2015 |

OTHER PUBLICATIONS

Matsushita. "Photometric Stereo." Information Processing Society of Japan. Technical Report. 2011:1-12. vol. 2011-CVIM-177, No. 29. Cited in Specification. English abstract provided.

(Continued)

*Primary Examiner* — Talha M Nawaz
(74) *Attorney, Agent, or Firm* — Rossi, Kimms & McDowell LLP (57) ABSTRACT

A processing apparatus includes a luminance information obtainer that obtains luminance information for each color in each of a plurality of images, each of which is imaged respectively when a light source arranged at mutually different positions sequentially irradiates an object with light, and a color setter that sets a color to use in obtaining surface normal information for each region of an image on the basis of the luminance information.

15 Claims, 6 Drawing Sheets

(51) Int. Cl.
    *H04N 13/254*    (2018.01)
    *H04N 13/257*    (2018.01)
    *H04N 13/271*    (2018.01)
    *G06T 7/586*     (2017.01)
    *H04N 13/00*     (2018.01)

(56) References Cited

U.S. PATENT DOCUMENTS

| | | | | |
|---|---|---|---|---|
| 2009/0207462 | A1* | 8/2009 | Arimoto | G06K 9/2018 |
| | | | | 358/509 |
| 2009/0297020 | A1* | 12/2009 | Beardsley | G06T 7/521 |
| | | | | 382/154 |
| 2011/0058237 | A1* | 3/2011 | Mikami | H04N 1/40056 |
| | | | | 358/509 |
| 2012/0154422 | A1* | 6/2012 | Ninan | G02B 27/2264 |
| | | | | 345/589 |
| 2013/0270421 | A1* | 10/2013 | Kanamori | G02B 23/24 |
| | | | | 250/208.1 |

OTHER PUBLICATIONS

European Search Report issued in European Patent Application No. 16002507.8 dated Aug. 11, 2017.

Malzbender et al., Surface Enhancement Using Real-time Photometric Stereo and Reflectance Transformation, Proceedings of the Sixteenth Eurographics Conference on Rendering Techniques, Jun. 26, 2006, pp. 245-250.

Bringier et al., Photometric Reconstruction of a Dynamic Textured Surface From Just One Color Image Acquisition, Journal of the Optical Society of America A, Mar. 1, 2008, pp. 566-574, vol. 25, No. 3.

\* cited by examiner

PROCESSING APPARATUS, PROCESSING SYSTEM, IMAGE PICKUP APPARATUS, PROCESSING METHOD, AND NON-TRANSITORY COMPUTER-READABLE STORAGE MEDIUM

BACKGROUND OF THE INVENTION

Field of the Invention

The present invention relates to a processing apparatus, a processing system, an image pickup apparatus, a processing method, and a non-transitory computer-readable storage medium.

Description of the Related Art

Obtaining more physical information regarding an object can generate images based on a physical model in image processing after imaging. For example, an image where visibility of the object is changed can be generated. Visibility of the object is determined on the basis of information such as shape information of the object, reflectance information of the object and light source information. As physical behavior of reflected light that is emitted from a light source and is reflected by the object depends on a local surface normal, using not a three-dimensional shape but the surface normal of the object as shape information is especially effective. As a method obtaining the surface normal of the object, for example, a method that converts a three-dimensional shape calculated from distance information obtained using a method such as triangulation using laser light and a twin-lens stereo into surface normal information is known. However, such a method complicates the structure of the apparatus, and accuracy of the obtained surface normal is insufficient.

In Japanese Patent Laid-Open No. 2010-122158 and "Photometric stereo" (A research report of Information Processing Society of Japan, Vol. 2011-CVIM-177, No. 29, pp. 1-12, 2011) by Yasuyuki Matsushita, a photometric stereo method is disclosed as a method obtaining the surface normal of the object directly. In the photometric stereo method, reflectance characteristics of the object based on the surface normal of the object and a direction from the object to the light source is assumed, and the surface normal is calculated from luminance information of the object at a plurality of light source positions and the assumed reflectance characteristics. The reflectance characteristics of the object can be, for example, approximated using a Lambert reflection model in dependence upon a Lambert's cosine law.

In an image pickup apparatus such as a digital camera, when surface normal information of the object is obtained using the photometric stereo method, a plurality of pieces of luminance information at a plurality of wavelengths (colors) such as red information (hereinafter referred to as "Rch."), green information (hereinafter referred to as "Gch.") and blue information (hereinafter referred to as "Bch.") are obtained. The obtained luminance information depends on color information of the object and the light source, and thus has a S/N ratio different for each wavelength (each color). Accordingly, influence of noise on the luminance information differs for each wavelength (each color), and as a result, variability of obtained surface normal information differs for each wavelength (each color). For example, when a red object is imaged for each of wavelengths of Rch., Gch. and Bch., in Rch., a S/N ratio is high and variability of surface normal information is small, but, in Gch. and Bch., a S/N ratio is low and variability of surface normal information is large. That is, surface normal information is required to be calculated using a proper wavelength (a proper color) based on the obtained luminance information. However, Japanese Patent Laid-Open No. 2010-122158 and "Photometric stereo" (A research report of Information Processing Society of Japan, Vol. 2011-CVIM-177, No. 29, pp. 1-12, 2011) by Yasuyuki Matsushita fail to disclose an obtaining method of surface normal information using a proper wavelength (color) based on the obtained luminance information.

SUMMARY OF THE INVENTION

In the view of the problem, the present invention can provide a processing apparatus, a processing system, an image pickup apparatus, a processing method, and a non-transitory computer-readable storage medium capable of calculating surface normal information using a proper wavelength (a proper color) based on obtained luminance information.

A processing apparatus according to one aspect of the present invention includes a luminance information obtainer that obtains luminance information for each color in each of a plurality of images, each of which is imaged respectively when a light source arranged at mutually different positions sequentially irradiates an object with light, and a color setter that sets a color to use in obtaining surface normal information for each region of an image on the basis of the luminance information.

A processing system according to another aspect of the present invention includes a luminance information obtainer that obtains luminance information for each color in each of a plurality of images, each of which is imaged respectively when a light source arranged at mutually different positions sequentially irradiates an object with light, a color setter that sets a color to use in obtaining surface normal information for each region of an image on the basis of the luminance information, and a surface normal obtainer that obtains the surface normal information on the basis of luminance information of the color to use in obtaining surface normal information.

An image pickup apparatus according to another aspect of the present invention includes an image pickup unit that images an object, a luminance information obtainer that obtains luminance information for each color in each of a plurality of images, each of which is imaged by the image pickup unit respectively when a light source arranged at mutually different positions sequentially irradiates the object with light, a color setter that sets a color to use in obtaining surface normal information for each region of an image on the basis of the luminance information, and a surface normal obtainer that obtains the surface normal information on the basis of luminance information of the color to use in obtaining surface normal information.

A processing method according to another aspect of the present invention includes a step of obtaining luminance information for each color in each of a plurality of images, each of which is imaged respectively when a light source arranged at mutually different positions sequentially irradiates an object with light, and a step of setting a color to use in obtaining surface normal information for each region of an image on the basis of the luminance information.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings. In each of the drawings, the same elements will be denoted by the same reference numerals and the duplicate descriptions thereof will be omitted.

Figure 8:
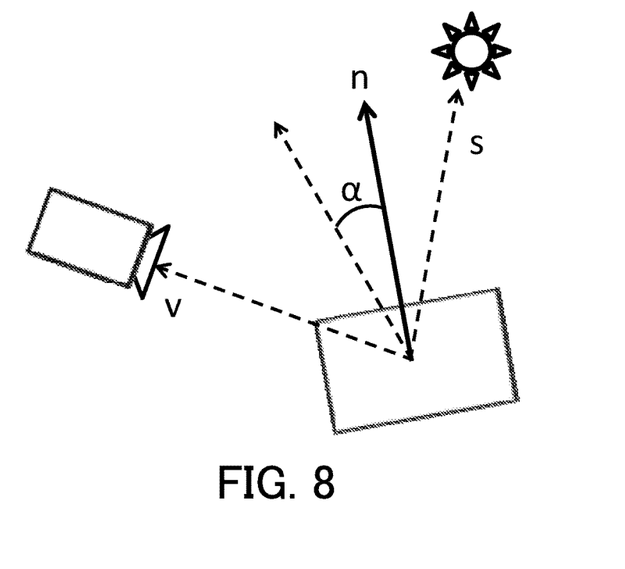
FIG. 8 is an explanatory diagram of a Torrance-Sparrow model.

In the photometric stereo method, reflectance characteristics of an object based on a surface normal of the object and a direction from the object to a light source is assumed, and the surface normal is calculated from luminance information of the object at a plurality of light source positions and the assumed reflectance characteristics. When the reflectance is not uniquely determined by receiving a predetermined surface normal and the light source position, the reflectance characteristics should be approximated using a Lambert reflection model in dependence upon a Lambert's cosine law. In addition, a specular reflection component, as illustrated in FIG. 8, depends on an angle α formed by a bisector of an angle between a light source vector s and a visual line direction vector v, and the surface normal n. Accordingly, the reflectance characteristics may be based on the visual line direction. Additionally, from the luminance information, influence by light such as environmental light other than light from the light source may be excluded by taking a difference between luminance of the object imaged in the case where the light source is lighted and luminance of the object imaged in the case where the light source is turned off.

Hereinafter, the reflectance characteristics assumed by the Lambert reflection model will be explained. When a luminance value of reflected light is i, Lambert diffuse reflectance of the object is $\rho_d$, intensity of incident light is E, a unit vector (a light source vector) representing a direction (light source direction) from the object to the light source is s, and a unit surface normal vector of the object is n, the luminance value i is expressed by the following expression (1) on the basis of the Lambert's cosine law.

$$i = E\rho_d s \cdot n \quad (1)$$

When components of different M (M≥3) light source vectors are respectively defined as $s_1, s_2, \ldots, s_M$ and luminance values for each component of the light source vectors are respectively defined as $i_1, i_2, \ldots, i_M$, the expression (1) is expressed by the following expression (2).

$$\begin{bmatrix} i_1 \\ \vdots \\ i_M \end{bmatrix} = \begin{bmatrix} s_1^T \\ \vdots \\ s_M^T \end{bmatrix} E\rho_d n \quad (2)$$

In the expression (2), the left side is a luminance vector expressed by a matrix of M row and 1 column, and a matrix $[s_1^T, \ldots s_M^T]$ and a symbol n of the right side are respectively an incident light matrix S of M row and 3 column representing the light source direction, and the unit surface normal vector expressed by a matrix of 3 row and 1 column. When the number M is equal to 3, a product $E\rho_d n$ are expressed by the following expression (3) using an inverse matrix $S^{-1}$ of the incident light matrix S.

$$E\rho_d n = S^{-1} \begin{bmatrix} i_1 \\ \vdots \\ i_M \end{bmatrix} \quad (3)$$

A norm of vectors of the left side of the expression (3) is a product of the intensity E of the incident light and the Lambert diffuse reflectance $\rho_d$, and a normalized vector is calculated as a surface normal vector of the object. In other words, the intensity E of the incident light and the Lambert diffuse reflectance $\rho_d$ is expressed as the product in the expression. When the product $E\rho_d$ is considered as one variable, the expression (3) is regarded as simultaneous equations to determine unknown three variables with two freedom degrees of the unit surface normal vector n. Thus, obtaining the luminance information using at least three light source can determine each variable. When the incident light matrix S is not a regular matrix, an inverse matrix of the incident light matrix S does not exist and thus the components $s_1$ to $s_3$ of the incident light matrix S should be selected so that the incident light matrix S is the regular matrix. That is, the component $s_3$ is preferably selected linearly independently with respect to the components $s_1$ and $s_2$.

Additionally, when the number M is larger than 3, conditions more than unknown variables are obtained and thus the unit surface normal vector n may be calculated from arbitrary selected three conditional expressions using the same method as the method in the case where the number M is equal to 3. When four or more conditional expressions are used, the incident light matrix S is not the regular matrix. In this case, for example, an approximate solution may be calculated using a Moore-Penrose pseudo inverse matrix. The unit surface normal vector n may be also calculated using a fitting method or an optimization method.

When the reflectance characteristics are assumed by a model different from the Lambert reflection model, the conditional expression may differ from a linear equation for each component of the unit surface normal vector n. In this case, if the conditional expressions more than unknown variables are obtained, the fitting method or the optimization method can be used.

Moreover, when the number M is larger than 3, a plurality of conditions between 3 and M−1 are obtained and thus a plurality of solution candidates of the unit surface normal vector n can be calculated. In this case, a solution should be selected from the plurality of solution candidates using further another condition. For example, continuity of the unit surface normal n can be used as the condition. In calculating the unit surface normal n for each of pixels of the image pickup apparatus, when the surface normal in a pixel (x, y) is n(x, y) and a pixel n(x−1, y) is known, a solution may be selected to minimize an evaluation function expressed by the following expression (4).

$$1 - n(x, y) \cdot n(x-1, y) \quad (4)$$

Furthermore, when pixels n(x+1, y) and n(x, y±1) are known, a solution may be selected to minimize the following expression (5).

$$4 - n(x,y) \cdot n(x-1,y) - n(x,y) \cdot n(x+1,y) - n(x,y) \cdot n(x,y-1) - n(x,y) \cdot n(x,y+1) \quad (5)$$

When a known surface normal does not exist and indefiniteness of the surface normal at each of all pixel positions exists, a solution may be selected to minimize a sum of all pixels of the expression (5) expressed by the following expression (6).

$$\sum_{x,y} \{4 - n(x, y) \cdot n(x - 1, y) - n(x, y) \cdot n(x + 1, y) - n(x, y) \cdot n(x, y - 1) - n(x, y) \cdot n(x, y + 1)\} \quad (6)$$

A surface normal in a pixel other than a nearest pixel or an evaluation function weighted according to a distance from a target pixel position may be also used.

In addition, as another condition, luminance information at an arbitrary light source position may be used. In a diffuse reflection model represented by the Lambert reflection model, luminance of reflected light increases with an approach of the unit normal vector and the light source direction vector. Accordingly, selecting a solution close to the light source direction vector having the largest luminance value of luminance values at a plurality of light source directions can determines the unit surface normal vector.

Alternatively, in a specular reflection model, when the light source vector is s and a unit vector (a visual line vector of a camera) of a direction from the object to the camera, the following expression (7) is satisfied.

$$s + v = 2(v \cdot n)n \quad (7)$$

As expressed by the expression (7), when the light source vector s and the visual line vector of the camera v are known, the unit surface normal vector n can be calculated. When a surface has roughness, specular reflection has a spread of an emitting angle, but spreads near a solution calculated by assuming that the surface is smooth. Thus, a candidate near the solution with respect to the smooth surface from the plurality of solution candidates may be selected. Besides, a true solution may be determined using an average of the plurality of solution candidates.

First Example

Figure 1:
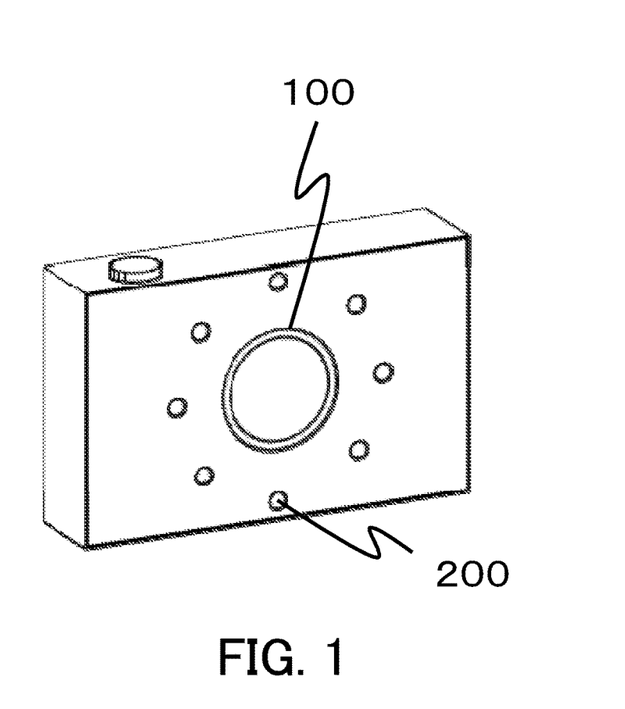
FIG. 1 is an appearance view of an image pickup apparatus (a first example and a second example).
Figure 2A:
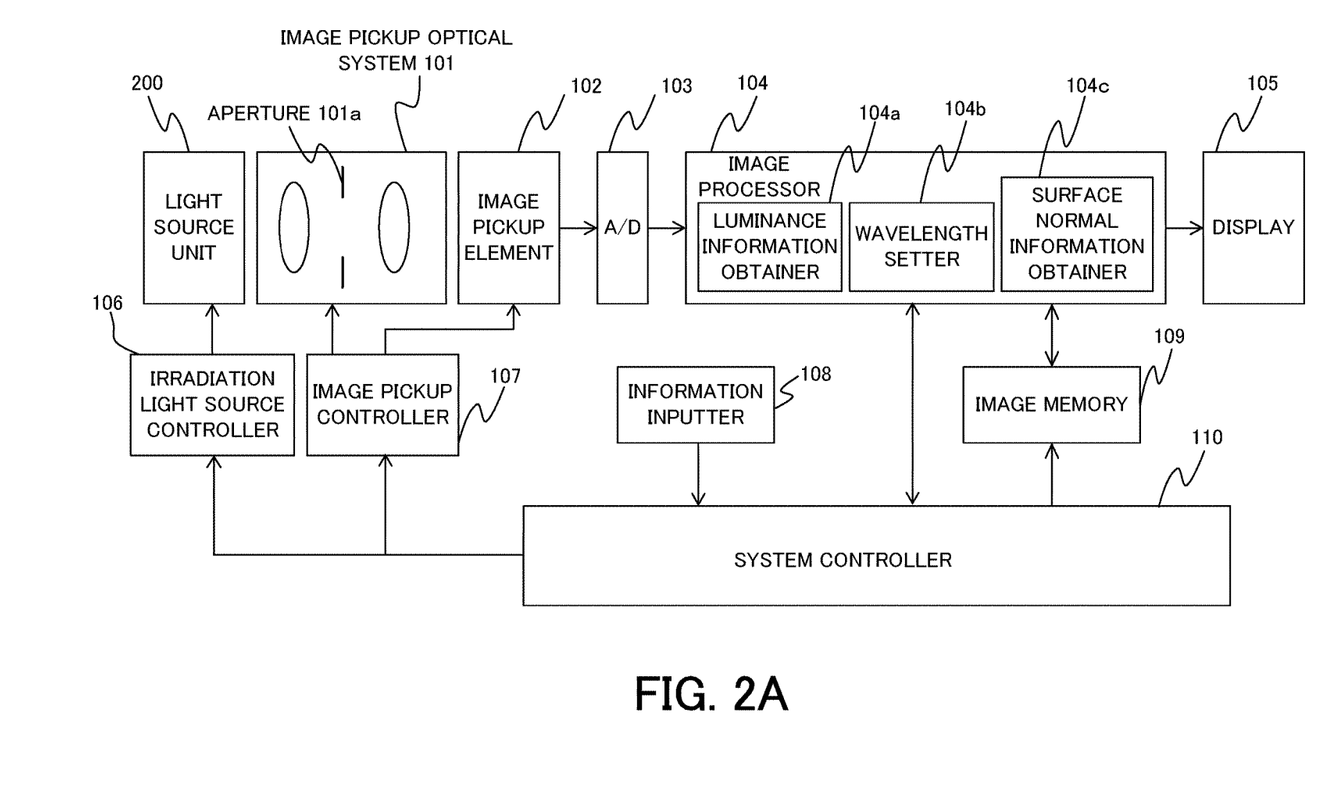
FIG. 2A is a block diagram of the image pickup apparatus (the first and second examples).

FIG. 1 is an appearance view of an image pickup apparatus according to this example, and FIG. 2A is a block diagram of the image pickup apparatus. The image pickup apparatus includes an image pickup unit 100 and a light source unit 200. The image pickup unit 100 includes an image pickup optical system 101. The light source unit 200 includes eight light sources arranged at equal intervals in a concentric circle shape around an optical axis of the image pickup optical system 101. As light sources necessary to perform the photometric stereo method are three, the light source unit 200 may include three or more light sources. In this example, the light source unit 200 includes the plurality of light sources arranged at equal intervals in the concentric circle shape around the optical axis of the image pickup optical system 101, but the present invention is not limited to this. Additionally, in this example, the light source unit 200 is built in the image pickup apparatus, but may be detachably attached to the image pickup apparatus.

The image pickup optical system 101 includes an aperture 101a and forms an image of light from an object on the image pickup element 102. In this example, the image pickup optical system 101 is built in the image pickup apparatus, but may be detachably attached to the image pickup apparatus like a single-lens reflex camera. The image pickup element 102 is configured by a photoelectric conversion element such as a CCD sensor and a CMOS sensor, and images the object. An analog electrical signal generated by the photoelectric conversion of the image pickup element 102 is converted into a digital signal by an A/D convertor 103 and the digital signal is input to an image processor 104.

The image processor 104 performs general image processing to the digital signal and calculates surface normal information of the object. The image processor 104 includes a luminance information obtainer 104a that obtains luminance information, a wavelength setter (a color setter) 104b that sets a wavelength (a color) to use in obtaining surface normal information, and a surface normal information obtainer 104c that obtains the surface normal information. An output image processed by the image processor 104 is stored in an image memory 109 such as a semiconductor memory and an optical disc. The output image may be also displayed by a display 105. In this embodiment, the luminance information obtainer 104a and a wavelength setter 104b are incorporated in the image pickup apparatus, but may be configured as a processing apparatus different from the image pickup apparatus.

An information inputter 108 supplies a system controller 110 with image pickup conditions (for example, an aperture value, an exposure time or a focal length) selected by a user. An irradiation light source controller 106 controls a light emitting state of the light source unit 200 depending on instructions from the system controller 110. An image obtainer 107 obtains images on the desired image pickup condition selected by the user on the basis of information from the system controller 110.

Figure 3:
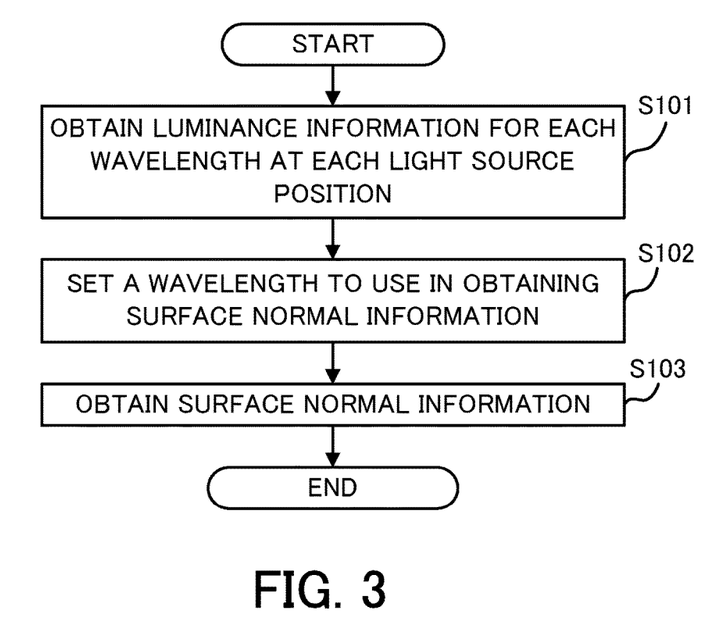
FIG. 3 is a flowchart illustrating surface normal calculation processing (the first and second examples).

Surface normal calculation processing according to this example will be explained in reference to a flowchart of FIG. 3. FIG. 3 is a flowchart illustrating the surface normal information calculation processing according to this example. The surface normal information calculation processing according to this example is executed by the system controller 110 and the image processor 104 in accordance with a processing program for allowing a computer to function as a processing apparatus. The processing program may be stored in, for example, a storage medium readable by a computer.

At step S101, the luminance information obtainer 104a obtains luminance information for each wavelength (each color) in each of a plurality of images, each of which is respectively imaged by the system controller 110 when alight source arranged at mutually different positions illuminates an object. The image pickup element 102 adopting a Bayer array illustrated in FIG. 4 obtains luminance information of only one wavelength (one color) for each pixel. In this example, the luminance information for each wavelength (each color) is obtained using the image pickup element adopting the Bayer array of Rch. Gch. and Bch., but the present invention is not limited to this. Moreover, in this example, the system controller 110 controls the irradiation light source controller 106 to control light source intensity of the light source unit 200 and to set a light source position when imaging the plurality of images, but the present invention is not limited to this. For example, the light source position may be set by changing a position of a single light source, and may be set using a plurality of light sources, which are arranged at mutually different positions, different from the light source unit 200.

At step S102, the wavelength setter 104b sets a wavelength (a color) to use in obtaining surface normal information on the basis of the luminance information obtained at step S101. The obtained luminance information depends on color information of the object and the light source, and thus has a S/N ratio different for each wavelength (each color) in each pixel. Accordingly, influence of noise on the luminance information differs for each wavelength (each color), and as a result, variability of obtained surface normal information differs for each wavelength (each color) in each pixel.

Considering noise in the expression (2), the expression (2) is deformed by the following expression (8).

$$\begin{bmatrix} i_1 + \text{noise}_1 \\ \vdots \\ i_M + \text{noise}_M \end{bmatrix} = \begin{bmatrix} s_1^T \\ \vdots \\ s_M^T \end{bmatrix} E\rho_d n \quad (8)$$

In addition, considering noise in the expression (3), the expression (3) is deformed by the following expression (9).

$$E\rho_d n = S^{-1}\left(\begin{bmatrix} i_1 \\ \vdots \\ i_M \end{bmatrix} + \begin{bmatrix} \text{noise}_1 \\ \vdots \\ \text{noise}_M \end{bmatrix}\right) \quad (9)$$

Figure 4:
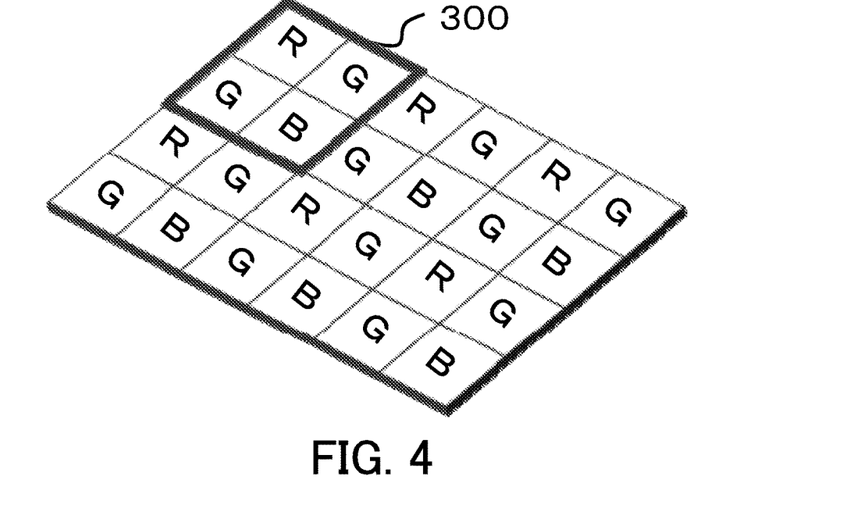
FIG. 4 is a schematic diagram illustrating obtained luminance information (the first example).

In the expressions (8) and (9), when influence of noise on the obtained luminance information enlarges, variability of obtained surface normal information n increases. Accordingly, the wavelength (the color) to use in obtaining surface normal information need to be properly set on the basis of the obtained luminance information. For example, a wavelength (a color) corresponding to luminance information having a maximum value among the plurality of pieces of luminance information of Rch. Gch. and Bch. for each region obtained at step S101 is set as the wavelength (the color) to use in obtaining surface normal information. In obtaining the value of the luminance information, an average value or a central value of the plurality of pieces of luminance information, which are obtained at a plurality of light source positions, may be used and a value of a piece of luminance information among the plurality of luminance information may be used. Additionally, the region may be, as illustrated in FIG. 4, a region 300 including four pixels or may be determined on the basis of a color of the object like a region where a ratio of luminance information for each wavelength (each color) in four pixels is within a certain range. When a plurality of pieces of luminance information corresponding to the same wavelength (the same color) exist in the region, an average value or a central value of the plurality of pieces of luminance information may be used. In this example, the region having four pixels is used as a region, but the present invention is not limited to this.

Moreover, a wavelength (a color) corresponding to luminance information having a value larger than a predetermined value may be set as the wavelength (the color) to use in obtaining surface normal information. Variability of obtained surface normal information is affected by noise characteristics to image pickup conditions such as ISO sensitivity and a luminance level of an image pickup apparatus included in the luminance information, and the number of light sources in imaging. Thus, the predetermined value may be set on the basis of noise characteristics of a sensor and the number of light sources. For example, the predetermined value is expressed by the following expression (10).

$$I_\lambda \geq C\left(\frac{\sigma_n}{\sqrt{N}}\right) \quad (10)$$

Here, $I_\lambda$ is the luminance information for each wavelength (each color), $\sigma_n$ is the noise characteristics, N is the number of light sources, and C is a constant number. A setting of the predetermined value is not limited to the expression (10). The noise characteristics may be obtained from a memory, which stores values measured in advance, according to the image pickup condition and the luminance information in imaging.

At step S103, the surface normal information obtainer 104c obtains surface normal information using the photometric stereo method on the basis of variations due to light source positions of luminance information of the wavelength (the color), which is used in obtaining surface normal information, set at step S102. For example, when the wavelength (the color) to use in obtaining surface normal information in the region is set to Rch., surface normal information only in a pixel of the wavelength (the color) is obtained. When the wavelength (the color) to use in obtaining surface normal information is set, in a pixel, which corresponds to a wavelength (a color) not set by the wavelength setter 104b, where surface normal information is not obtained directly, surface normal information is generated using various interpolation processing on the basis of surface normal information of a pixel near the pixel.

Figure 2B:
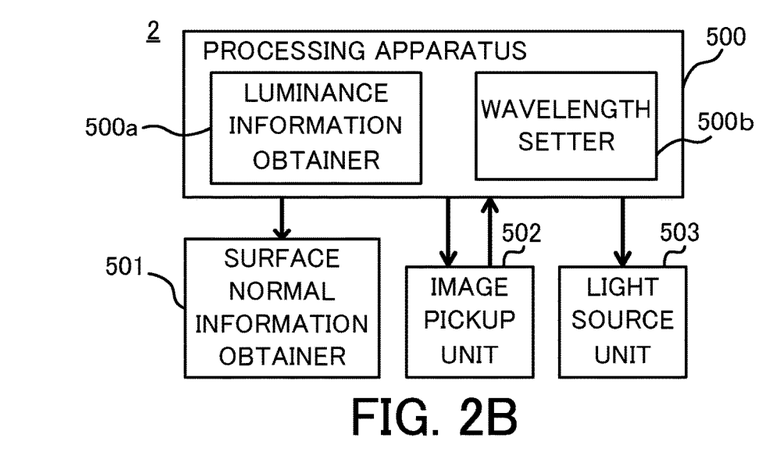
FIG. 2B is a block diagram of a processing system (the first and second examples).

In this example, the surface normal of the object is calculated in the image pickup apparatus, but, as illustrated in FIG. 2B, may be calculated using a processing system 2 having a configuration different from that of the image pickup apparatus. The processing system 2 illustrated in FIG. 2B includes a processing apparatus 500, a surface normal information obtainer 501, an image pickup unit 502 and a light source unit 503. The processing apparatus 500 includes a luminance information obtainer 500a and a wavelength setter (a color setter) 500b. When the processing system 2 calculates the surface normal, first, the light source unit 503 irradiates the object with light from at least three light source positions, and the image pickup unit 502 images an image at each light source position. When the light source unit 503 includes one light source, the light source position may be determined by moving the light source unit 503 for each imaging. When the light source unit 503 includes at least three light sources, the light source position may be determined by changing a light source irradiating light for each imaging. Second, the luminance information obtainer 500a obtains luminance information for a wavelength (a color) in each image, and the wavelength setter 500b sets a wavelength (a color) to use in surface normal information on the basis of the luminance information. Third, the surface normal information obtainer 501 obtains surface normal information on the basis of the luminance information of the wavelength (the color) set by the wavelength setter 500b. The processing system may include at least the processing apparatus 500 and the surface normal information obtainer 501, and the processing apparatus 500 may include the surface normal information obtainer 501. Moreover, the image pickup unit 502 and the light source unit 503 may be individual apparatuses, and the light source unit 503 may be built in the image pickup unit 502.

As mentioned above, in this example, surface normal information can be obtained using a proper wavelength (a proper color) based on obtained luminance information.

Second Example

Figure 5:
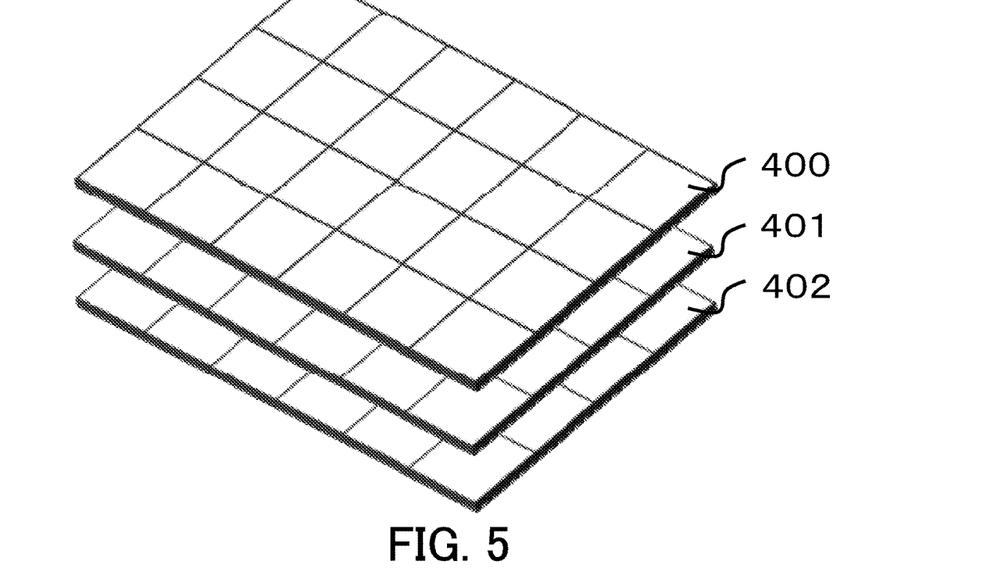
FIG. 5 is a schematic diagram illustrating obtained luminance information (the second example).

An image pickup apparatus according to this example has a configuration similar to that of the image pickup apparatus according to the first example illustrated in FIGS. 1 and 2A. Thus, detailed descriptions of the configuration similar to that explained in the first example will be omitted. In this example, as illustrated in FIG. 5, when luminance information of a plurality of wavelengths (colors) is obtained for one pixel, surface normal information is obtained using a proper wavelength (a proper color) based on the obtained luminance information.

Surface normal calculation processing according to this example will be explained in reference to a flowchart of FIG. 3 as with the first example. The surface normal information calculation processing according to this example is executed by the system controller 110 and the image processor 104 in accordance with a processing program for allowing a computer to function as a processing apparatus. The processing program may be stored in, for example, a storage medium readable by a computer.

At step S101, the luminance information obtainer 104a obtains luminance information for each wavelength (each color) in each of a plurality of images, each of the images is respectively imaged by the system controller 110 when a light source arranged at mutually different positions illuminates an object. The image pickup element 102 obtains a plurality of pieces of luminance information 400 to 402 of three wavelengths (three colors) as illustrated in FIG. 5. In this example, the luminance information includes a plurality of pieces of luminance information of three wavelengths of Rch., Gch. and Bch. in one pixel, but the present invention is not limited to this. In addition, the luminance information of the three wavelengths (three colors) may be obtained using a single image pickup element, or may be obtained using a plurality of image pickup elements including each of wavelength filters each having different characteristics. In using a single image pickup element, luminance information may be obtained by performing demosaic processing to luminance information, which is obtained by an image pickup element adopting a Bayer array, using a wavelength filter, or may be obtained by an image pickup element including a plurality of wavelength filters in a single pixel.

At step S102, the wavelength setter 104b sets a wavelength (a color) to use in obtaining surface normal information on the basis of the luminance information obtained at step S101. In particular, the wavelength setter 104b sets the wavelength (the color) to use in obtaining surface normal information on the basis of values of the plurality of pieces of luminance information of Rch., Gch. and Bch. in each region. The region may be composed of one pixel. Additionally, the region may be determined on the basis of a color of the object like a region where a ratio of luminance information for each wavelength (each color) is within a certain range. Moreover, a weighted linear sum of luminance information for each wavelength (each color) obtained by weighting the luminance information for each wavelength (each color) in each pixel according to values may be used as luminance information in obtaining surface normal information at step S103. In this case, a weight of luminance information of a wavelength (a color) having a high S/N ratio, that is, a large value is set to be large.

At step S103, the surface normal information obtainer 104c obtains surface normal information using the photometric stereo method on the basis of variations due to light source positions of luminance information of the wavelength (the color), which is used in obtaining surface normal information, set at step S102. When a plurality of pieces of surface normal information are obtained due to a setting of the wavelength (the color) to use in obtaining surface normal information, an average value of values of the plurality of pieces of surface normal information may be used as the surface normal information. Alternatively, the surface normal information may be obtained by performing weighted average processing, where a weight is set to be larger as a value of luminance information for each wavelength (each color) is larger.

As mentioned above, in this example, surface normal information can be obtained using a proper wavelength (a proper color) based on obtained luminance information.

Third Example

An image pickup apparatus according to this example has a configuration similar to that of the image pickup apparatus according to the first and second examples illustrated in FIGS. 1 and 2A. Thus, detailed descriptions of the configuration similar to that explained in the first example will be omitted.

Figure 6:
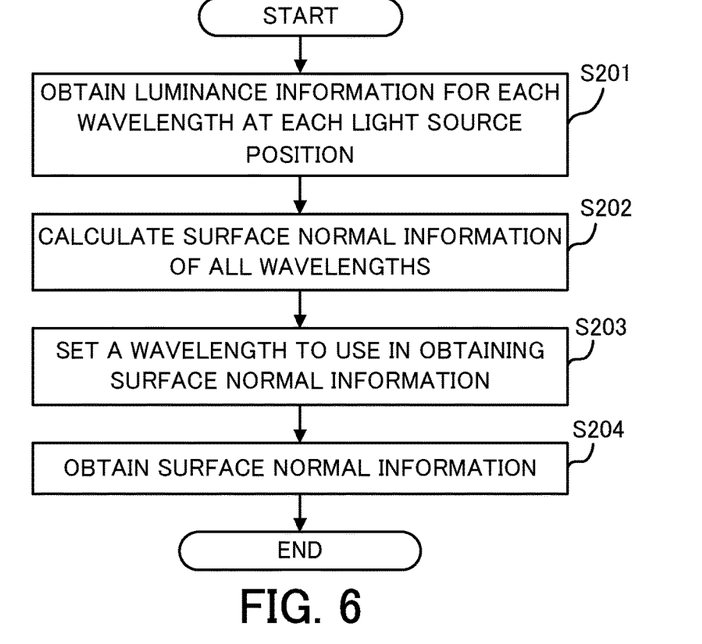
FIG. 6 is a flowchart illustrating surface normal calculation processing (a third example).

Surface normal calculation processing according to this example will be explained in reference to a flowchart of FIG. 6. FIG. 6 is a flowchart illustrating the surface normal information calculation processing according to this example. The surface normal information calculation processing according to this example is executed by the system controller 110 and the image processor 104 in accordance with a processing program for allowing a computer to function as a processing apparatus. The processing program may be stored in, for example, a storage medium readable by a computer.

At step S201, the luminance information obtainer 104a obtains luminance information for each wavelength (each color) in each of a plurality of images, each of which is respectively imaged by the system controller 110 when alight source arranged at mutually different positions illuminates an object. The image pickup element 102 may obtain luminance information of only one wavelength (one color) in each pixel as explained in the first example, or may obtain luminance information of a plurality of wavelengths (colors) in each pixel as explained in the second example.

At step S202, the surface normal information obtainer 104c calculates surface normal information of all wavelengths (all colors) of Rch., Gch. and Bch. on the basis of the luminance information at a plurality of light source positions.

At step S203, the wavelength setter 104b sets a wavelength (a color) to use in obtaining surface normal information on the basis of the luminance information obtained at step S201. Processing at step S203 is performed before the processing at step S202.

At step S204, the surface normal information obtainer 104c selects using surface normal information on the basis of the wavelength (the color) to use in obtaining surface normal information set at step S203 from the plurality of pieces of surface normal information calculated at step S202. When the wavelength (the color) to use in obtaining surface normal information is set, in a pixel, where surface normal information is not obtained directly, surface normal information is generated using various interpolation processing on the basis of surface normal information of a pixel near the pixel.

As mentioned above, in this example, surface normal information can be obtained using a proper wavelength (a proper color) based on obtained luminance information.

Fourth Example

In the first to third second examples, the image pickup apparatus including the light source unit 200 was explained, but, in this example, a surface normal information obtaining system including an image pickup apparatus and a light source unit will be explained.

Figure 7:
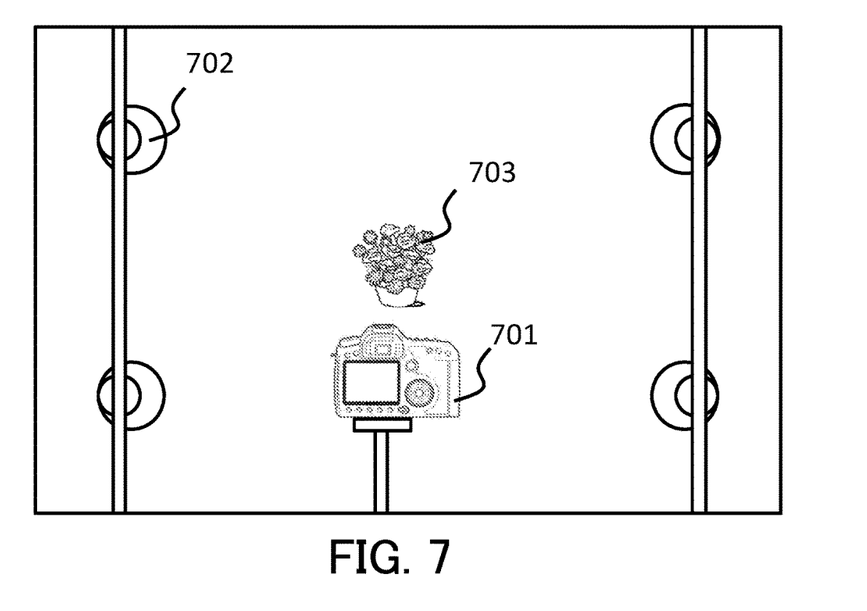
FIG. 7 is an appearance view illustrating a surface normal information obtaining system (a fourth example).

FIG. 7 is an appearance view illustrating the normal information obtaining system. The normal information obtaining system includes an image pickup apparatus 701 imaging an object 703, and a light source unit 702 having a plurality of light sources. The image pickup apparatus 701 according to this example is the same as that according to the first to third examples, but need not include the plurality of light sources for the photometric stereo method as a light source unit. Preferably, the light source unit 702 is connected with the image pickup apparatus 701 by wire or wireless and is controlled on the basis of information from the image pickup apparatus 701. When the light source unit 702 cannot automatically change the light source position or cannot be controlled by the image pickup apparatus 701, users may adjust the light source unit 702 to satisfy the light source condition displayed by a display of the image pickup apparatus 701.

In the photometric stereo method, images imaged using at least three light sources are required, but, when a light source unit, which can change the light source position, is used like this example, the light source unit may include at least one light source. However, changing positions of the light source unit to perform photographing at least three light source positions is required.

As mentioned above, in this example, the surface normal information of the object can be obtained using a proper wavelength (a proper color) based on obtained luminance information. Surface normal calculation processing according to this example is the same as the processing of the first to third examples, detailed explanations thereof are omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232849, filed on Nov. 30, 2015, which is hereby incorporated by reference herein in its entirety.

What is claimed is:

1. A processing apparatus comprising:
a luminance information obtainer that obtains luminance information for each color in each of a plurality of images of an object, each of the plurality of images of the object being respectively imaged when the object is irradiated with light from mutually different positions sequentially; and
a color setter that sets a color to use in obtaining surface normal information for each region of an image of the object on the basis of the luminance information,
wherein the color setter sets a color from among a plurality of colors to use in obtaining surface normal information on the basis of a value of the luminance information such that a first color among the plurality of colors is set to be used in obtaining surface normal information in a case where the value of the luminance information has a first value, and a second color among the plurality of colors different from the first color is set to be used in obtaining surface normal information in a case where the value of the luminance information has a second value different from the first value.

2. The processing apparatus according to claim 1, further comprising a surface normal obtainer that obtains the surface normal information on the basis of luminance information of the color to use in obtaining surface normal information.

3. A processing apparatus comprising:
a luminance information obtainer that obtains luminance information for each color in each of a plurality of images of an object, each of the plurality of images of the object being respectively imaged when the object is irradiated with light from mutually different positions sequentially;
a color setter that sets a color to use in obtaining surface normal information for each region of an image of the object on the basis of the luminance information; and
a surface normal obtainer that obtains the surface normal information on the basis of luminance information of the color to use in obtaining surface normal information,
wherein the color setter sets a weight for a color on the basis of a value of the luminance information, and
wherein the surface normal obtainer obtains the surface normal information on the basis of a linear sum of luminance information for a color calculated using the weight.

4. The processing apparatus according to claim 1, wherein the color setter sets a color corresponding to luminance information having a maximum value among a plurality of pieces of the luminance information in the region as the color to use in obtaining surface normal information.

5. The processing apparatus according to claim 1, wherein the color setter sets a color corresponding to luminance information having a value larger than a predetermined value in the region as the color to use in obtaining surface normal information.

6. The processing apparatus according to claim 5, wherein the predetermined value is determined on the basis of noise characteristics and a number of the mutually different positions.

7. A processing system comprising:
a luminance information obtainer that obtains luminance information for each color in each of a plurality of images of an object, each of the plurality of images of the object being respectively imaged when the object is irradiated with light from mutually different positions sequentially;
a color setter that sets a color to use in obtaining surface normal information for each region of an image of the object on the basis of the luminance information; and
a surface normal obtainer that obtains the surface normal information on the basis of luminance information of the color to use in obtaining surface normal information,
wherein the color setter sets a color from among a plurality of colors to use in obtaining surface normal information on the basis of a value of the luminance information such that a first color among the plurality of colors is set to be used in obtaining surface normal information in a case where the value of the luminance information has a first value, and a second color among the plurality of colors different from the first color is set to be used in obtaining surface normal information in a case where the value of the luminance information has a second value different from the first value.

8. The processing system according to claim 7, further comprising a light source unit that includes three or more light sources each different in a position.

9. An image pickup apparatus comprising:
an image pickup unit that images an object;
a luminance information obtainer that obtains luminance information for each color in each of a plurality of images of an object, each of the plurality of images of the object being imaged by the image pickup unit respectively when the object is irradiated with light from mutually different positions sequentially;
a color setter that sets a color to use in obtaining surface normal information for each region of an image of the object on the basis of the luminance information; and
a surface normal obtainer that obtains the surface normal information on the basis of luminance information of the color to use in obtaining surface normal information,
wherein the color setter sets a color from among a plurality of colors to use in obtaining surface normal information on the basis of a value of the luminance information such that a first color among the plurality of colors is set to be used in obtaining surface normal information in a case where the value of the luminance information has a first value, and a second color among the plurality of colors different from the first color is set to be used in obtaining surface normal information in a case where the value of the luminance information has a second value different from the first value.

10. The image pickup apparatus according to claim 9, further comprising a light source unit that includes three or more light sources each different in a position.

11. The image pickup apparatus according to claim 9, wherein the image pickup unit includes an image pickup element adopting a Bayer array.

12. The image pickup apparatus according to claim 11, wherein the surface normal obtainer obtains surface normal information of a first pixel corresponding to a color different from the color to use in obtaining surface normal information on the basis of surface normal information of one or more second pixels near the first pixel.

13. A processing method comprising:
obtaining luminance information for each color in each of a plurality of images of an object, each of the plurality of images of the object being respectively imaged when the object is irradiated with light from mutually different positions sequentially; and
setting a color to use in obtaining surface normal information for each region of an image of the object on the basis of the luminance information,
wherein the setting the color sets a color from among a plurality of colors to use in obtaining surface normal information on the basis of a value of the luminance information such that a first color among the plurality of colors is set to be used in obtaining surface normal information in a case where the value of the luminance information has a first value, and a second color among the plurality of colors different from the first color is set to be used in obtaining surface normal information in a case where the value of the luminance information has a second value different from the first value.

14. The processing method according to claim 13, further comprising:
calculating a plurality of pieces of surface normal information on the basis of the luminance information; and
selecting surface normal information from among the plurality of pieces of surface normal information on the basis of the color to use in obtaining surface normal information.

15. A non-transitory computer-readable storage medium configured to store a computer program that enables a computer to execute a processing method,
wherein the processing method includes:
obtaining luminance information for each color in each of a plurality of images of an object, each of the plurality of images of the object being respectively imaged when the object is irradiated with light from mutually different positions sequentially; and
setting a color to use in obtaining surface normal information for each region of an image of the object on the basis of the luminance information,
wherein the setting the color sets a color from among a plurality of colors to use in obtaining surface normal information on the basis of a value of the luminance information such that a first color among the plurality of colors is set to be used in obtaining surface normal information in a case where the value of the luminance information has a first value, and a second color among the plurality of colors different from the first color is set to be used in obtaining surface normal information in a case where the value of the luminance information has a second value different from the first value.

* * * * *